(12) United States Patent
Furujo et al.

(10) Patent No.: US 8,598,487 B2
(45) Date of Patent: Dec. 3, 2013

(54) PLASMA CUTTING METHOD FOR CUTTING A CARBON STEEL PLATE AND FOR REDUCING FINE PARTICLES

(75) Inventors: Akira Furujo, Tokyo (JP); Masatoshi Motoyama, Tokyo (JP); Nobuo Ito, Tokyo (JP); Go Sasaki, Tokyo (JP); Takayuki Takarada, Gunma (JP); Kayoko Morishita, Gunma (JP)

(73) Assignee: Koike Sanso Kogyo Co., Ltd., Tokyo (JP)

( * ) Notice: Subject to any disclaimer, the term of this patent is extended or adjusted under 35 U.S.C. 154(b) by 243 days.

(21) Appl. No.: 12/664,918

(22) PCT Filed: Jun. 18, 2008

(86) PCT No.: PCT/JP2008/061091
§ 371 (c)(1),
(2), (4) Date: Jul. 7, 2011

(87) PCT Pub. No.: WO2008/156097
PCT Pub. Date: Dec. 24, 2008

(65) Prior Publication Data
US 2011/0297652 A1 Dec. 8, 2011

(30) Foreign Application Priority Data

Jun. 21, 2007 (JP) ................................. 2007-163786

(51) Int. Cl.
*B23K 10/00* (2006.01)
(52) U.S. Cl.
USPC ............. 219/121.44; 219/121.39; 219/121.59
(58) Field of Classification Search
CPC ..................................................... B23K 10/00
USPC ............. 219/121.39, 121.44, 121.59, 121.55, 219/121.46
See application file for complete search history.

(56) References Cited

U.S. PATENT DOCUMENTS 3,567,898 A * 3/1971 Fein .......................... 219/121.5
5,396,043 A * 3/1995 Couch et al. ............... 219/121.5
(Continued)

FOREIGN PATENT DOCUMENTS

| JP | 2-268980 A | 11/1990 |
| JP | 3-291105 A | 12/1991 |
| JP | 8-112674 A | 5/1996 |

OTHER PUBLICATIONS

International Search Report in corresponding PCT Applicaiton No. PCT/JP2008/061091.

*Primary Examiner* — Mark Paschall
(74) *Attorney, Agent, or Firm* — Smith Patent Office

(57) ABSTRACT

[PROBLEMS] To reduce the generation of fume in cutting a material to be cut typified by a steel plate with plasma.
[MEANS FOR SOLVING PROBLEMS] A plasma cutting method comprising spraying a plasma arc directed through a material to be cut from a plasma torch nozzle to cut the cutting material, wherein a plasma arc formed by supplying a mixed gas as a plasma gas composed of a single gas or a plurality of gases selected from halogen gases and rare gases belonging to up to the second row elements of the periodic table and a hydrogen gas, and oxygen-, argon- or nitrogen-containing gas to a part around an electrode, and electrifying a part between the electrode and the nozzle or between the electrode and the cutting material is sprayed toward the cutting material to cut the cutting material, or wherein a single gas or a plurality of gases selected from halogen gases or rare gases belonging to up to the second row elements of the periodic table and a hydrogen gas, together with the plasma arc composed mainly of an oxygen, argon or nitrogen gas, is sprayed toward the cutting material to cut the cutting material.

1 Claim, 6 Drawing Sheets

(56) References Cited

U.S. PATENT DOCUMENTS

| | | | |
|---|---|---|---|
| 5,653,896 A * | 8/1997 | Couch et al. | 219/121.44 |
| 6,232,575 B1 * | 5/2001 | Oakley et al. | 219/121.55 |
| 6,335,505 B2 * | 1/2002 | Billerot | 219/121.55 |
| 6,583,378 B1 * | 6/2003 | Yamaguchi et al. | 219/121.52 |
| 7,112,759 B1 * | 9/2006 | Severance, Jr. | 219/121.52 |
| 7,326,875 B2 * | 2/2008 | Krink et al. | 219/121.59 |
| 7,375,303 B2 * | 5/2008 | Twarog | 219/121.52 |
| 2008/0210670 A1 * | 9/2008 | Brandt et al. | 219/121.55 |

\* cited by examiner

PLASMA CUTTING METHOD FOR CUTTING A CARBON STEEL PLATE AND FOR REDUCING FINE PARTICLES

TECHNICAL FIELD

The present invention relates to a plasma cutting method of spraying a plasma arc from a plasma torch nozzle toward a workpiece to cut the workpiece, and particularly relates to a plasma cutting method capable of reducing fumes generated accompanying cutting.

BACKGROUND ART

In the case of cutting a workpiece typified by a steel plate, it is common to adopt a plasma cutting method that has a high cutting speed as compared with a gas cutting method. A plasma cutting torch is classified into a non-transfer type plasma torch and a transfer type plasma torch, and in the case of cutting a relatively thick workpiece, the transfer type plasma torch is commonly used.

In the transfer type plasma torch, a plasma gas made up of an oxygen gas or an air is supplied to a space constituted by an electrode and a nozzle, and electricity is discharged between the electrode and the nozzle to form plasma from the plasma gas so as to form a pilot ark, which is then sprayed from the nozzle, and after the pilot ark comes into contact with the workpiece, electricity is discharged between the electrode and the workpiece while the discharge between the electrode and the nozzle is stopped, to form a main arc (plasma arc), which is moved while melting part of the workpiece and also removing a melt from a base material, to perform cutting.

In the plasma cutting, part of the base material is melt by thermal energy of the plasma arc to produce a melt, and part of the base material is rapidly oxidized by action of oxygen contained in the plasma gas to produce an oxidized melt and fine particles of an oxide. The melt and the fine particles as thus produced are removed from the base material by mechanical energy of the plasma arc.

The melt of the base material and the oxidized melt drop below the workpiece and are accommodated into a slag reception bath. Further, a relatively large particle drops below the workpiece, or flies in the vicinity of the cut portion and then drops onto the top surface of the workpiece. However, there occurs a problem in that the fine particles of the oxide might fly around the workpiece to have an adverse effect upon a working environment of a factory.

For this reason, a plasma cutting device is commonly provided with a smoke ejecting device and a dust collecting device (e.g. see Patent Document 1). This technique is to form a lateral smoke path provided in juxtaposition with a partition in an orthogonal position to a rail in a space below a body of a plasma cutter, dispose a suction hood and an exhaust hood in positions corresponding to this smoke path, and connect these hoods through a duct, while providing a dust collector at the duct. Therefore, fine particles (fumes) that fly in cutting of the workpiece can be collected into the dust collector through the suction hood and the duct so as to seek improvement in operating environment of the factory.

Patent Document 1: Japanese Patent No. 1315469

DISCLOSURE OF THE INVENTION

In the foregoing technique of Patent Document 1, fine particles (fumes) generated accompanying plasma cutting can be collected by the dust collector, to reduce flying of the fine particles so as to improve the working environment of the factory, but an amount of fine particles produced accompanying the plasma cutting is not reduced and it thus cannot be considered as a fundamental solution. Hence the fact is that there has been a demand for development of a plasma cutting method capable of reducing an amount of fumes to improve a working environment.

An object of the present invention is to provide a plasma cutting method capable of reducing generation of fumes at the time of cutting a workpiece.

The present inventors and the like made a variety of development for the purpose of solving the above problem. That resulted in a finding that making a gas (plasma gas) that forms a plasma arc a gas of a particular component, or adding a gas of a particular component to a plasma arc formed of a conventional plasma gas made up of oxygen or an air, can reduce generation of fumes.

Namely, a workpiece was cut using, as a plasma gas, a mixed gas made up of an oxygen-, argon- or nitrogen containing gas and one kind or a plurality of kinds of gases selected from a halogen gas and a rare gas up to the elements in the second period of the periodic table and a hydrogen gas, and distributions of particle sizes of particles having flown from the cut portion were compared, whereby it was found that the ratio of particles having large particle sizes was high and the ratio of fine particles tending to fly was low. This led to a finding that the amount of fine particles became smaller, thereby enabling reduction in generation of fumes.

Further, a plasma arc was formed of oxygen, argon or nitrogen, the same components as conventional ones, or further a mixed gas of these, and along with this plasma arc, one kind or a plurality of kinds of gases selected from a halogen gas and a rare gas up to the elements in the second period of the periodic table and a hydrogen gas was sprayed to cut the workpiece, and distributions of particle sizes of particles having flown from the cut portion were compared, whereby it was found that the ratio of particles having large particle sizes was high and the ratio of fine particles tending to fly was low. This led to a finding that the amount of fine particles became smaller, thereby enabling reduction in generation of fumes.

Therefore, the plasma cutting method according to the present invention is a plasma cutting method of spraying a plasma arc from a plasma torch nozzle toward a workpiece to cut the workpiece, wherein a plasma arc is sprayed toward the workpiece to cut the workpiece, the plasma arc being formed by supplying to a periphery of an electrode a mixed gas as a plasma gas made up of an oxygen-containing gas and one kind or a plurality of kinds of gases selected from a halogen gas, a rare gas and a hydrogen gas up to the elements in the second period of the periodic table and applying a current between the electrode and the nozzle or between the electrode and the workpiece.

With the plasma cutting method of the present invention, a plasma arc is formed by supplying to a periphery of an electrode a mixed gas made up of an oxygen-, argon- or nitrogen containing gas and one kind or a plurality of kinds of gases selected from a halogen gas and a rare gas up to the elements in the second period of the periodic table and a hydrogen gas, and a workpiece is cut by this plasma arc, so that generation of fumes can be reduced.

Further, a plasma arc is formed of a plasma gas mainly composed of oxygen, argon or nitrogen, and along with this plasma arc, one kind or a plurality of kinds of gases selected from a halogen gas and a rare gas up to the elements in the second period of the periodic table and a hydrogen gas is sprayed to cut the workpiece, so that generation of fumes can be reduced.

When the workpiece is cut by the plasma cutting method according to the present invention, a total amount of products accompanying the cutting remains unchanged. However, it can be said that particle sizes of the produced particles on the whole become larger, leading to reduction in amount of fine particles that tend to fly in the air, thereby allowing reduction in generation of fumes.

BEST MODE FOR CARRYING OUT THE INVENTION

Figure 1:
FIG. 1 is a photograph of fine particles constituting fumes scaled up 300 times, showing a state of the fine particles.

In the following, a plasma cutting method according to the present invention is described. The plasma cutting method of the present invention is a method of forming a plasma arc by using, as a plasma gas, one kind or a plurality of kinds of gases (hereinafter collectively referred to as "added gas") selected from a halogen gas and a rare gas up to the elements in the second period of the periodic table and a hydrogen gas, and a gas of oxygen, argon or nitrogen or a mixed gas of these (hereinafter referred to as "oxygen gas" as a representative one), or a method of spraying the added gas along with a plasma arc formed of the oxygen gas, to increase particle sizes of particles of a base material and particles of an oxide, generated with the progress of cutting of a workpiece typified by a steel plate when the workpiece is cut, thereby lowing the ratio of the fine particles that fly from the cut portion to reduce fumes.

The added gas as the plasma gas or the gas to be added to the plasma arc is one kind or a plurality of kinds of gases selected from a halogen gas and a rare gas up to the elements in the second period of the periodic table and a hydrogen gas ($H_2$). The halogen gas in the above range is fluorine (F), and the rare gas in the above range is helium (He) as well as neon (Ne). Therefore, as the added gas, a hydrogen gas, fluorine, helium and neon are used singly or as a gas of mixture of more than one kind of gases.

When the plasma gas is constituted of the mixed gas of the added gas and the oxygen gas, a mixing ratio of the added gas and the oxygen gas is not particularly restricted, and slightly mixing the added gas with the oxygen gas can reduce fumes. Further, also in the case of mixing a large amount of added gas with respect to the oxygen gas, fumes can be sufficiently reduced.

However, when the mixing ratio of the added gas to the oxygen gas is small, while fumes can be reduced, it is difficult to realize sufficiently enough reduction to improve the working environment. Further, when the mixing ratio of the added gas to the oxygen gas is made large, while fumes can be reduced sufficiently, a problem of lowering of a cutting speed takes place.

Accordingly, when the plasma gas is constituted of the mixed gas of the added gas and the oxygen gas, the mixing ratio of the added gas and the oxygen gas is preferably set in consideration of the degree of improvement in working environment, cost of the added gas that relatively costs high, and an increase in operating cost with lowering of the cutting speed.

In experiments conducted by the present inventors and the like, in the case of using a plasma gas made by mixture of the added gas in the range of 1 to 50% by volume with respect to the oxygen gas, substantially equivalent cutting speeds, at which quality of the cutting surface can be held, have been obtained. Further, the higher the ratio of the added gas become, the more the degree of reduction in fumes improves, but in the case of using a plasma gas made by mixture of not smaller than 50% by volume of the added gas with respect to the oxygen gas, there was no choice but to lower the cutting speed for maintaining the quality of the cutting surface.

Moreover, such a result has been obtained that, when improvement in working environment due to reduction in fumes and maintaining of the cutting speed are considered, the mixing ratio of the added gas to be mixed with respect to the oxygen gas is preferably in the range of 5 to 40% by volume, and particularly preferably in the range of 15 to 25% by volume.

EXAMPLE 1

Helium was selected as an added gas, and a plasma gas was constituted of a mixed gas of 20% by volume of helium and 80% by volume of an oxygen gas of high purity. As a workpiece, a mild steel plate having a thickness of 20 mm was used. The plasma gas was supplied to the vicinity of an electrode in a plasma torch to form a pilot arc, a current of 400 A is applied between the electrode and the workpiece to form a plasma arc, a cutting speed was set to 1200 mm per minute, and cutting was performed in the above condition. In the process of this cutting, a generating state of fumes was visually determined, while fumes were collected to observe a state of fine particles.

Figure 2:
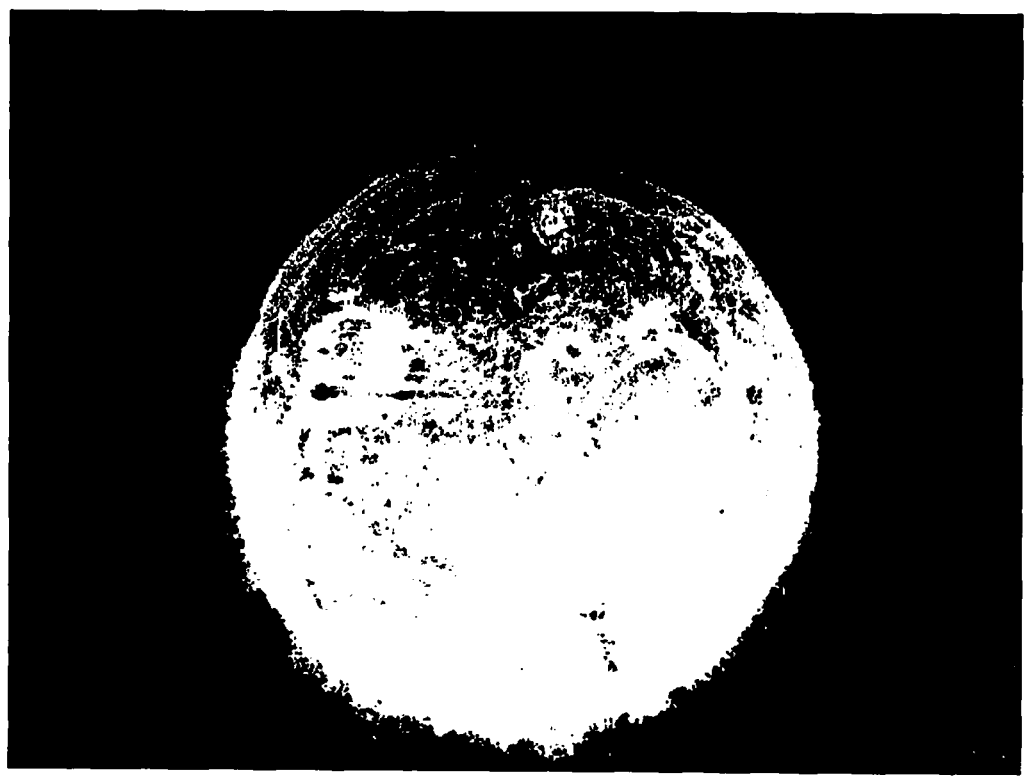
FIG. 2 is a photograph of the fine particle further scaled up 1000 times.
Figure 3:
FIG. 3 is a photograph of the fine particle of FIG. 2 further scaled up 20000 times, showing a cloud-yarn shaped portion around the fine particle (ultrafine particle).

FIG. 1 is a photograph of fine particles constituting fumes scaled up 300 times, showing a state of the fine particles. FIG. 2 is a photograph of the fine particle further scaled up 1000 times. FIG. 3 is a photograph of the fine particle of FIG. 2 further scaled up 20000 times, showing a cloud-yarn shaped portion around the fine particle (ultrafine particle).

Moreover, as a comparative example, an oxygen gas of high purity was adopted as the plasma gas, cutting was performed with the other conditions made the same as above, and in this process, a generating state of fumes was visually determined, while fumes were collected to observe a state of fine particles. The state of collected fumes was then compared with that of the example.

Figure 4:
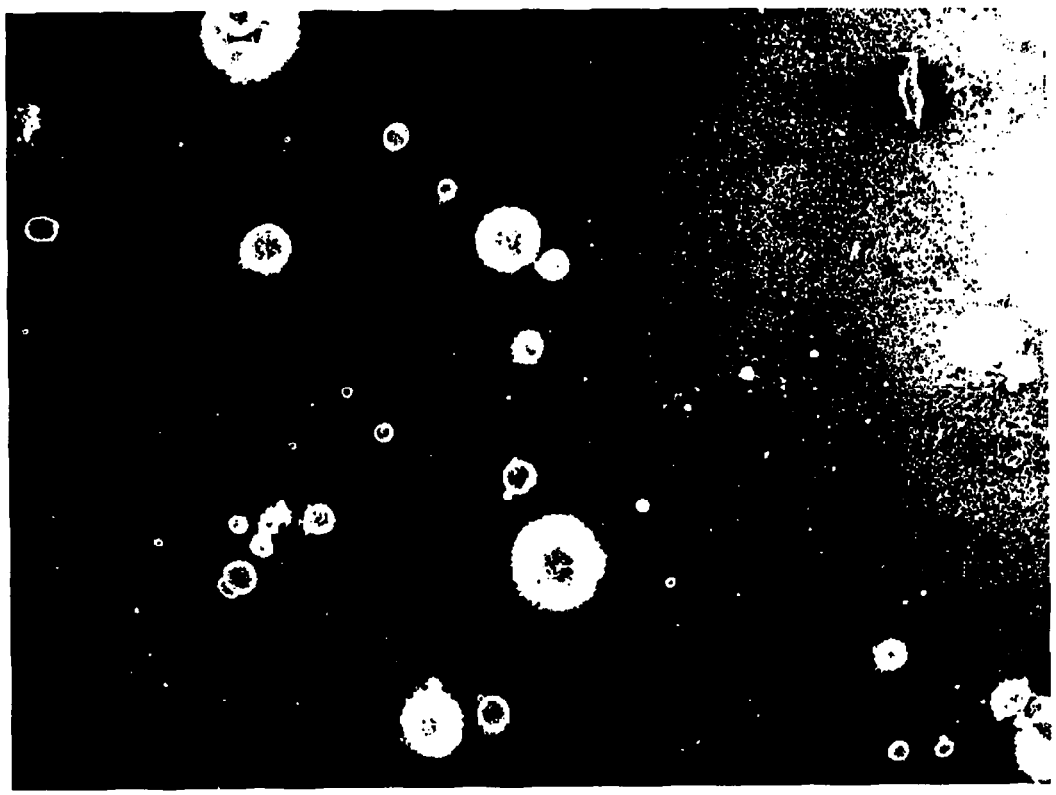
FIG. 4 is a photograph of fine particles constituting fumes scaled up 300 times, showing a state of the fine particles.
Figure 5:
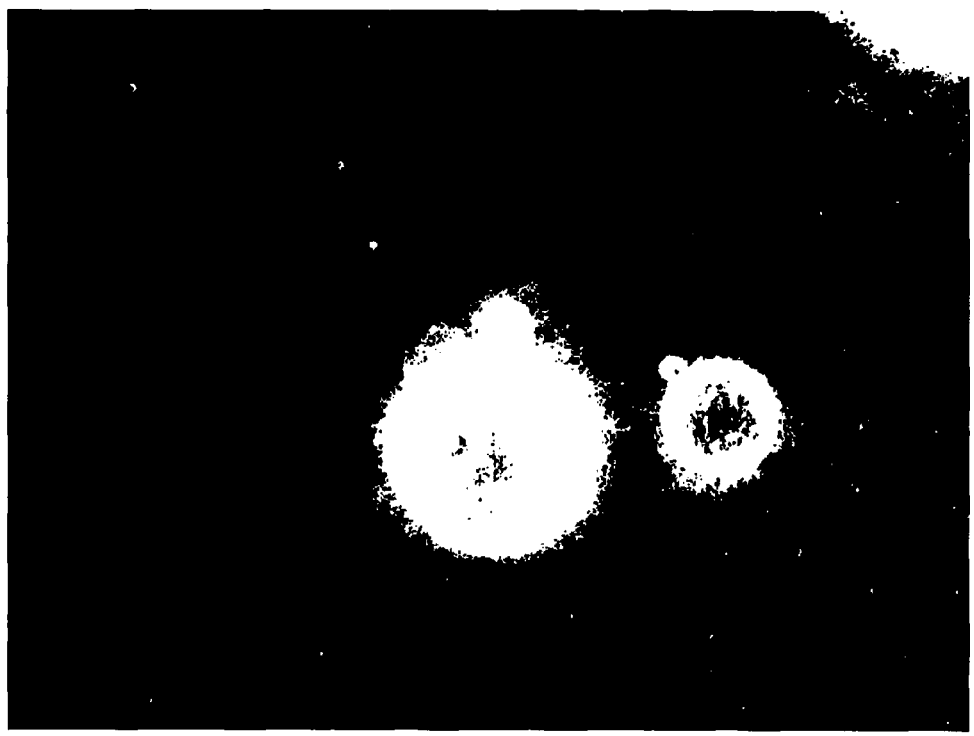
FIG. 5 is a photograph of the fine particles further scaled up 1000 times.
Figure 6:
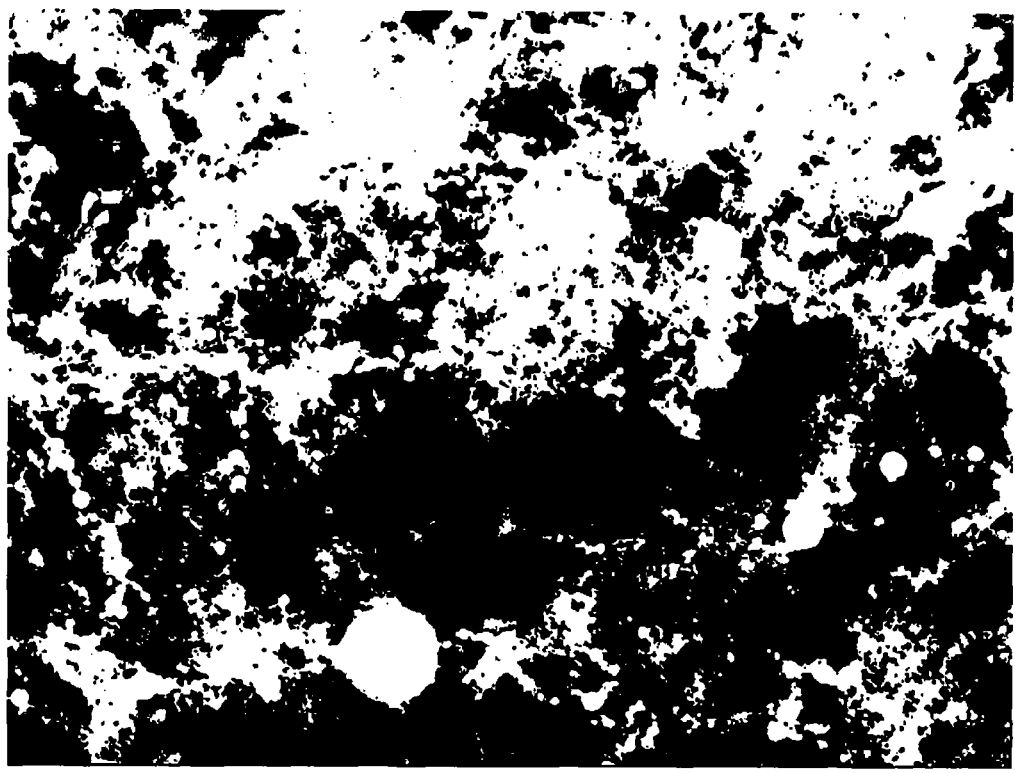
FIG. 6 is a photograph of the fine particle of FIG. 5 further scaled up 20000 times, showing a cloud-yarn shaped portion around the fine particle (ultrafine particle).

FIG. 4 is a photograph of fine particles constituting fumes scaled up 300 times, showing a state of the fine particles. FIG. 5 is a photograph of the fine particles further scaled up 1000 times. FIG. 6 is a photograph of the fine particle of FIG. 5 further scaled up 20000 times, showing a cloud-yarn shaped portion around the fine particle (ultrafine particle).

It is therefore possible to compare FIGS. 1 and 4, FIGS. 2 and 5, and FIGS. 3 to 6 as pairs of the fine particles produced by the present example and the fine particles produced by the comparative example.

In the present example, as shown in FIG. 1, fine particles with diameters in the range of approximately 0.04 to 0.06 mm are present in a large number, and those with diameters on the order of 0.01 mm are present but in a small number. Further, as shown in FIG. 3, the cloud-yarn shaped portion (ultrafine particle) formed around the fine particle has a relatively small density.

Moreover, in the comparative example, as shown in FIG. 4, most fine particles have diameters in the range of approximately 0.01 to 0.03 mm. Further, as shown in FIG. 6, the cloud-yarn shaped portion (ultrafine particle) formed around the fine particle has a relatively large density.

As seen from comparisons between FIGS. 1 and 4 and FIGS. 2 and 5, the particle sizes of the particles produced in the cutting according to the present example are larger than the particle sizes of the particles produced in the cutting according to the comparative example. Hence the rate of the fine particles that fly in the air and become fumes becomes small, thus allowing reduction in fumes.

Industrial Applicability

The plasma cutting method of the present invention is capable of reducing fumes produced accompanying cutting, and can thus be advantageously used for improving a working environment.

The invention claimed is:

1. A plasma cutting method for cutting a carbon steel plate and for reducing an amount of fumes produced during cutting to be less than 1) the amount of fumes produced during cutting using only oxygen as a plasma gas and 2) the amount of fumes produced during cutting using only oxygen as a plasma gas and only oxygen around a plasma arc, said method comprising the steps of:

providing a plasma arc extending from a plasma torch nozzle toward a carbon steel plate for cutting the carbon steel plate;

adding at least one gas selected from helium, a hydrogen gas, and a mixture of helium and hydrogen gas to oxygen, wherein said step of adding includes adding the at least one gas in a range of 5 to 40% by volume with respect to the oxygen and supplying a mixed gas as a plasma gas made up of the at least one gas and the oxygen to a periphery of an electrode, and applying a current between the electrode and the plasma torch nozzle or between the electrode and the carbon steel plate, for cutting the carbon steel plate.

* * * * *